US012711783B2

(12) United States Patent
Li et al.

(10) Patent No.: US 12,711,783 B2
(45) Date of Patent: Aug. 18, 2026

(54) PARKING SPACE DETECTION METHOD, APPARATUS, DEVICE AND STORAGE MEDIUM

(71) Applicant: Black Sesame Technologies Co., Ltd., Wuhan (CN)

(72) Inventors: Haipeng Li, Shanghai (CN); Zhao Zhang, Shanghai (CN)

(73) Assignee: Black Sesame Technologies Co., Ltd., Wuhan (CN)

( * ) Notice: Subject to any disclaimer, the term of this patent is extended or adjusted under 35 U.S.C. 154(b) by 466 days.

(21) Appl. No.: 18/221,792

(22) Filed: Jul. 13, 2023

(65) Prior Publication Data

US 2024/0029448 A1 Jan. 25, 2024

(30) Foreign Application Priority Data

Jul. 14, 2022 (CN) ......................... 202210854345.8

(51) Int. Cl.
*G06V 20/58* (2022.01)
*G06V 10/34* (2022.01)
(Continued)

(52) U.S. Cl.
CPC ............ *G06V 20/586* (2022.01); *G06V 10/34* (2022.01); *G06V 10/44* (2022.01); *G06V 20/46* (2022.01)

(58) Field of Classification Search
None
See application file for complete search history.

(56) References Cited

U.S. PATENT DOCUMENTS 10,242,575 B1 * 3/2019 Chan ...................... G08G 1/142
2010/0296701 A1 * 11/2010 Hu ...................... G06V 10/809
382/103

(Continued)

FOREIGN PATENT DOCUMENTS

CN 113963230 1/2022
CN 114056324 2/2022
CN 114241395 A * 3/2022 ............ G06N 3/045

OTHER PUBLICATIONS

Matlab, Motion-Based Multiple Object Tracking: (Year: 2022).*

(Continued)

*Primary Examiner* — Chan S Park
*Assistant Examiner* — Promotto Tajrian Islam
(74) *Attorney, Agent, or Firm* — Fish & Richardson P.C.

(57) ABSTRACT

A parking space detection method, apparatus, device, and storage medium are provided. The method includes: obtaining image frames of a region where a current vehicle is located; for each image frame, recognizing one or more parking spaces and parking space corners of the recognized parking space; determining, based on the parking space corners, a verified parking space; tracking the verified parking space to record in a parking space tracking list a quantity of consecutive visible frames where the verified parking space is recognized, and a quantity of consecutive missing frames where the verified parking space is not recognized, and delete the verified parking space if the quantity of the consecutive missing frames reaches a first threshold; and determining and outputting, based on the parking space corners of the verified parking space, semantic information of the verified parking space if the quantity of consecutive visible frames reaches a second threshold.

20 Claims, 9 Drawing Sheets

(51) Int. Cl.
*G06V 10/44* (2022.01)
*G06V 20/40* (2022.01)

(56) References Cited

U.S. PATENT DOCUMENTS

| | | | | |
|---|---|---|---|---|
| 2015/0130640 | A1* | 5/2015 | Ryu | G08G 1/168<br>340/932.2 |
| 2022/0153259 | A1* | 5/2022 | Suddamalla | G06T 7/20 |

OTHER PUBLICATIONS

Park et al., "Deep Learning Based Parking Slot Detection and Tracking: PSDT-NET", DOI: https://doi.org/10.1007/978-3-030-97672-9_26 (Year: 2022).*

Wojke et al., "Simple Online and Realtime Tracking with a Deep Association Metric", DOI: https://doi.org/10.48550/arXiv.1703.07402 (Year: 2017).*

Bewley et al., "Simple Online and Realtime Tracking", DOI: https://doi.org/10.48550/arXiv.1602.00763 (Year: 2016).*

Roboflow Inference, "Byte Tracker", https://inference.roboflow.com/workflows/blocks/byte_tracker/ (Year: 2023).*

Wojke et al., "Simple Online and Realtime Tracking with a Deep Association Metric", DOI: 10.48550/arXiv.1703.07402, Publication Year: 2017 (Year: 2017).*

* cited by examiner

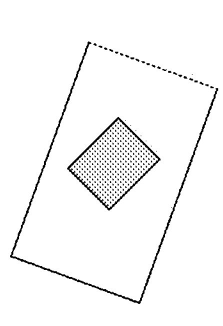

Quantity of intersecting sides=0
Quantity of interior corners=4

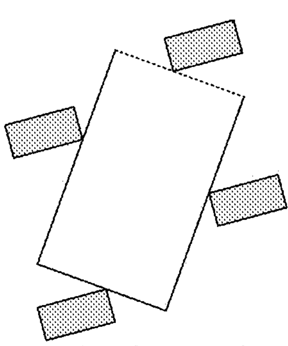

Quantity of intersecting sides=1
Quantity of interior corners=0

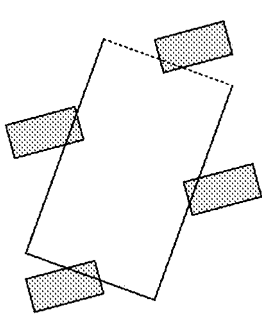

Quantity of intersecting sides=1
Quantity of interior corners=1

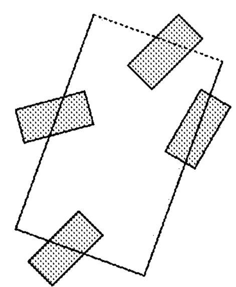

Quantity of intersecting sides=1
Quantity of interior corners=2

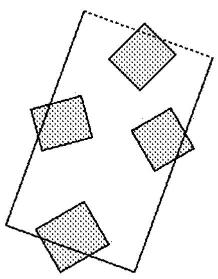

Quantity of intersecting sides=1
Quantity of interior corners=3

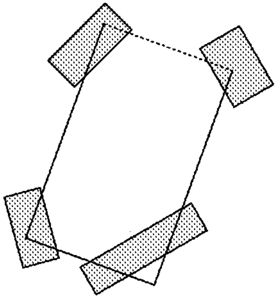

Quantity of intersecting sides=2
Quantity of interior corners=0

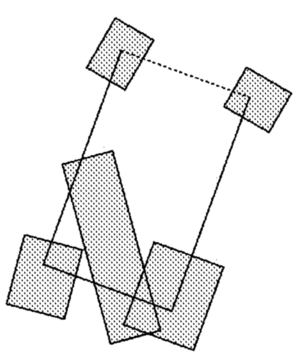

Quantity of intersecting sides=2
Quantity of interior corners=1

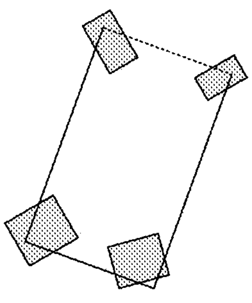

Quantity of intersecting sides=2
Quantity of interior corners=2

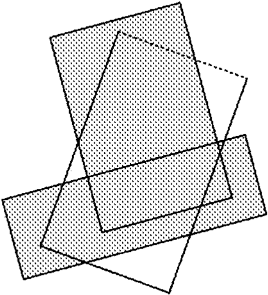

Quantity of intersecting sides=3

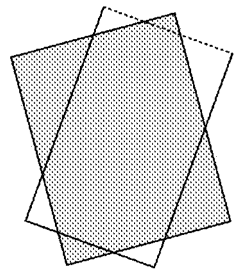

Quantity of intersecting sides=4

Figure 10

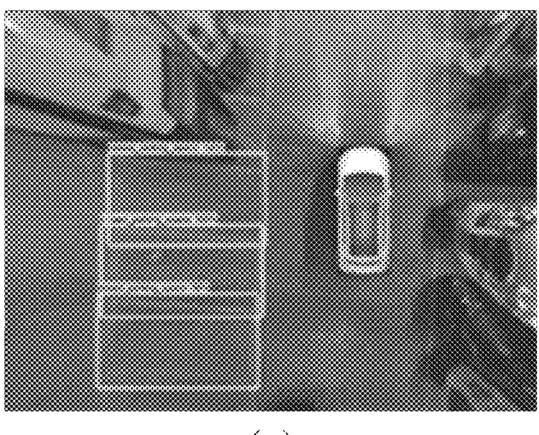
(a)
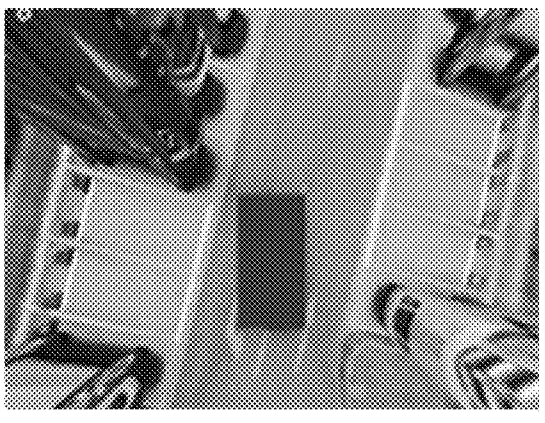
(b)
Figure 11
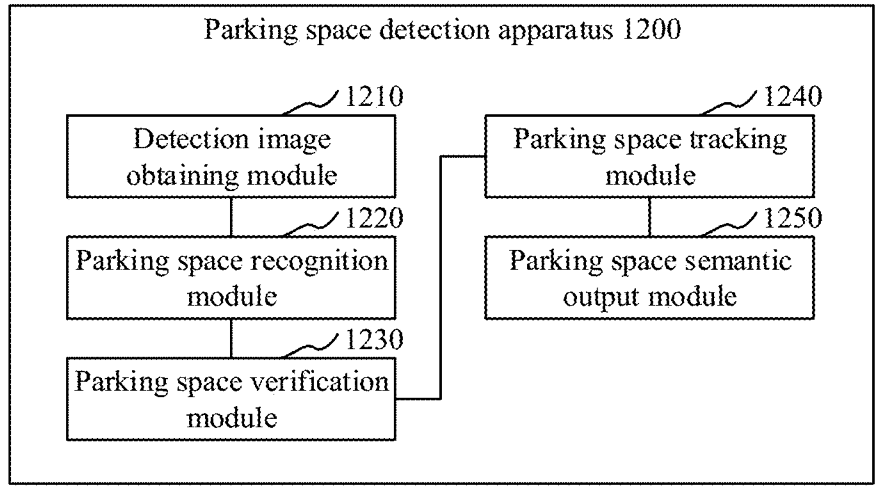
Figure 12

PARKING SPACE DETECTION METHOD, APPARATUS, DEVICE AND STORAGE MEDIUM

RELATED APPLICATION

This application claims the benefit under 35 U.S.C. § 119(a) of the filing date of Chinese Patent Application No. 202210854345, filed in the Chinese Patent Office on Jul. 14, 2022. The disclosure of the foregoing application is herein incorporated by reference in its entirety.

FIELD

The present disclosure relates to the technical field of vehicle detection, and in particular to a parking space detection method, a parking space detection apparatus, a parking space detection device and a storage medium.

BACKGROUND

In the technical field of intelligent driving, a vehicle perceives information inside and outside the vehicle by using various sensors installed in the vehicle to assist the driving of the vehicle.

For example, in a vehicle parking scene, the vehicle may use sensors such as a camera and a lidar to collect environmental information around the vehicle, and recognize the parking scene in which the vehicle is located by using the collected environmental information. Information related to a parking space in the parking scene is detected and outputted to assist the parking of the vehicle.

However, the conventional methods for detecting a parking space in a parking scene generally detect only a general area of the parking space, and may have the defect of insufficient parking space detection accuracy.

SUMMARY

Based on this, a parking space detection method, a parking space detection apparatus, a parking space detection device and a storage medium capable of detecting a parking space at low cost and with high accuracy are provided, to address the above technical problem.

A parking space detection method is provided, including:

obtaining multiple consecutive detection image frames of a region in which a current vehicle is located;

for each of the multiple consecutive detection image frames, recognizing one or more recognized parking spaces and parking space corners of the recognized parking space;

performing, based on the parking space corners, parking space verification to determine a verified parking space from the one or more recognized parking spaces;

tracking, by using a parking space tracking list, the verified parking space in the multiple consecutive detection image frames, to record, in the parking space tracking list, a quantity of consecutive visible frames among the multiple consecutive detection image frames in which the verified parking space is recognized, and a quantity of consecutive missing frames among the multiple consecutive detection image frames in which the verified parking space is not recognized, and delete the verified parking space from the parking space tracking list in a case that the quantity of the consecutive missing frames of the verified parking space reaches a first frame quantity threshold; and determining and outputting, based on the parking space corners of the verified parking space, parking space semantic information of the verified parking space if the quantity of consecutive visible frames of the verified parking space in the parking space tracking list reaches a second frame quantity threshold.

A parking space detection apparatus is provided, including a detection image obtaining module configured to obtain multiple consecutive detection image frames of a region in which a current vehicle is located;

a parking space recognition module configured to, for each of the multiple consecutive detection image frames, recognize one or more recognized parking spaces and parking space corners of the recognized parking space;

a parking space verification module configured to perform, based on the parking space corners, parking space verification to determine a verified parking space from the one or more recognized parking spaces;

a parking space tracking module configured to track, by using a parking space tracking list, the verified parking space in the multiple consecutive detection image frames, to record, in the parking space tracking list, a quantity of consecutive visible frames among the plurality of consecutive detection image frames in which the verified parking space is recognized, and a quantity of consecutive missing frames among the plurality of consecutive detection image frames in which the verified parking space is not recognized, and delete the verified parking space from the parking space tracking list in a case that the quantity of the consecutive missing frames of the verified parking space reaches a first frame quantity threshold; and a parking space semantic output module configured to determine and output, based on the parking space corners of the verified parking space, parking space semantic information of the verified parking space if the quantity of consecutive visible frames of the verified parking space in the parking space tracking list reaches a second frame quantity threshold.

A parking space detection device is provided. The parking space detection device is installed in a vehicle, and includes a memory and a processor. A computer program is stored in the memory. The processor implements the steps of the parking space detection as described in the above embodiments when executing the computer program.

A computer-readable storage medium on which a computer program is stored is provided. When the computer program is executed by a processor, the steps of the parking space detection as described in the above embodiments are implemented.

With the above parking space detection method, apparatus, device and storage medium, the parking space corners of each recognized parking space are recognized, and parking space verification is performed to determine the verified parking space, such that an unqualified parking space can be deleted in advance; the verified parking space is recorded and tracked by using the parking space tracking list, the verified parking space of which the quantity of the consecutive missing frames reaches the first frame quantity threshold is deleted from the parking space tracking list, and the parking space semantic information of each verified parking space of which the quantity of the consecutive visible frames reaches the second frame quantity threshold is outputted, so as to efficiently track the verified parking space in the required detection image frame and output the parking space semantic information, without outputting the parking space semantic information of the verified parking space of which the quantity of the consecutive missing frames reaches the first frame quantity threshold, so as to save computing resources and improve computing efficiency. Further, since the parking space semantic information and the verification of the parking space are based on the parking space corners of the parking space which are more precise, rather than a rough parking space area, the verification of the parking space and the analysis of the parking space semantic information can be more accurate and detailed.

BRIEF DESCRIPTION OF THE DRAWINGS

FIG. 10 is a schematic diagram of a possible exemplary intersection posture of a detection box representing a movable obstacle and a quadrilateral of a verified parking space according to an embodiment;

FIG. 11 is an exemplary bird's eye view of a detected parking space in the conventional technology and an exemplary bird's eye view of a parking space detected using the parking space detection method of the present disclosure;

FIG. 12 is a structural block diagram of a parking space detection apparatus according to an embodiment.

DETAILED DESCRIPTION OF EMBODIMENTS

In order to make the purpose, technical solution and advantages of the present disclosure clearer, the present disclosure will be further described in detail below in conjunction with the accompanying drawings and embodiments. It should be understood that the specific embodiments described here are only used to explain the present disclosure, and are not intended to limit the present disclosure.

Figure 1:
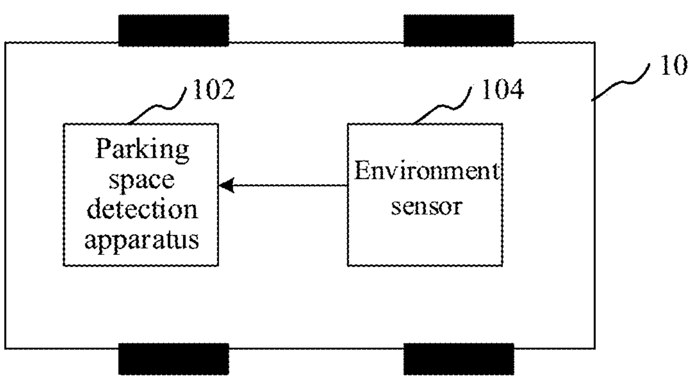
FIG. 1 is a schematic diagram of an application environment of a parking space detection method according to an embodiment.

The parking space detection according to the present disclosure is applicable to an application environment shown in FIG. 1. A parking space detection apparatus 102 is loaded in a vehicle 10, the parking space detection device 102 is connected to and communicates with an environment sensor 104 installed on the vehicle 10 for detecting environmental information of the vehicle. The parking space detection apparatus 102 receives the environmental information detected by the environment sensor 104, and obtain multiple consecutive detection image frames frame by frame and in a real time manner based on the environmental information. The environment sensor 104 in the present disclosure may be implemented by a visual sensor, such as a camera, so that detection of a parking space can be realized at a lower cost than the solution that involves an ultrasonic radar, a laser radar, and the like, to detect the parking space. The parking space detection apparatus 102 obtains the multiple detection image frames frame by frame and in a real time manner, and performs the parking space detection method of the present disclosure in a real time manner to detect and output parking space semantic information in each detection image frame. The vehicle 10 may further be equipped with a display apparatus, such as a display screen, and the parking space detection apparatus 102 outputs the parking space semantic information to the display apparatus, to display the parking space semantic information for viewing by a user through the display apparatus.

Figure 2:
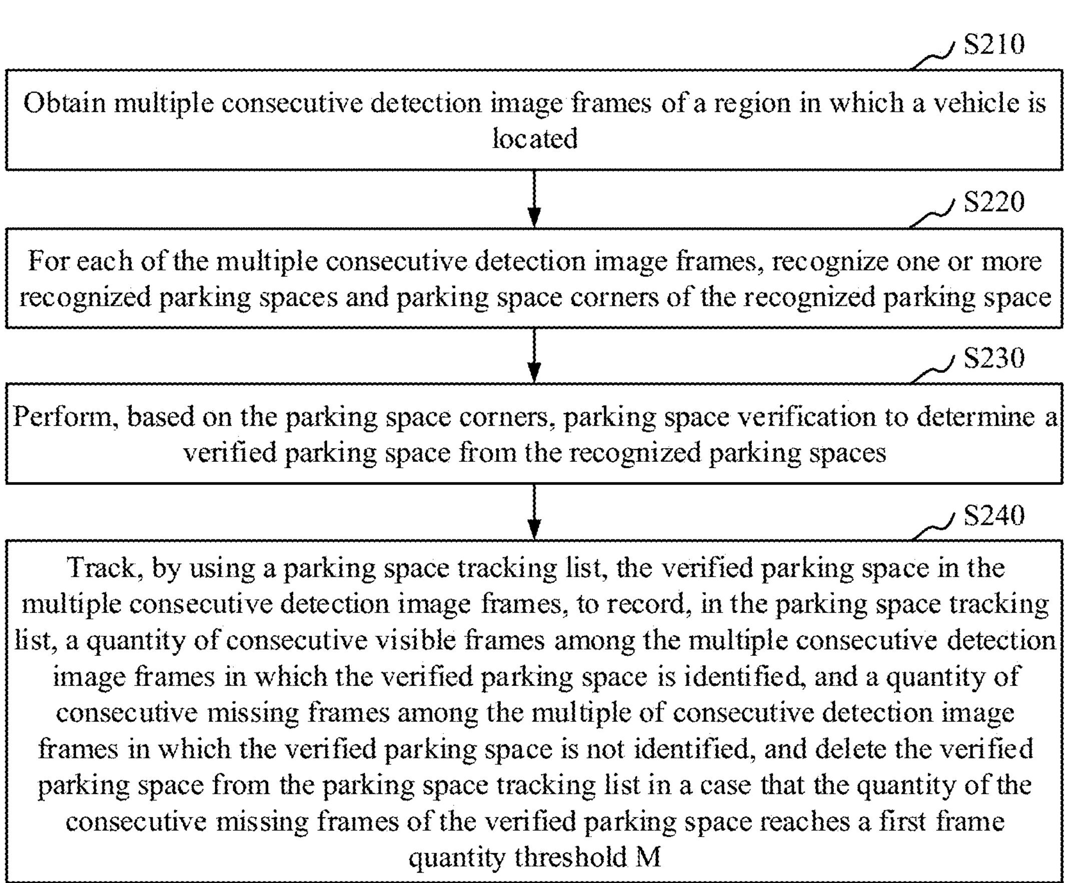
FIG. 2 is a flow chart of a parking space detection method according to an embodiment.

In an embodiment, as shown in FIG. 2, a parking space detection method is provided. A case where the method is applied to the parking space detection apparatus 102 in FIG. 1 is used as an example for illustration. The parking space detection method includes the following steps S210-S250.

In step S210, multiple consecutive detection image frames of a region in which a vehicle is located are obtained.

In this step, the parking space detection apparatus 102 may obtain the multiple consecutive detection image frames of the region in which the vehicle is located frame by frame by performing detection by using the environment sensor 104.

For example, the environment sensor 104 may include four fisheye cameras respectively fixed at a midpoint of a front bumper, a midpoint of a rear bumper, under a left rearview mirror, and under a right rearview mirror of the vehicle 10. The parking space detection apparatus 102 receives four environmental pictures from the four fisheye cameras in a real time manner, and synthesizes the four environmental pictures into a detection image, which may be, for example, a bird's eye view (BEV), so as to obtain multiple detection image frames.

In step S220, for each of the multiple consecutive detection image frames, one or more recognized parking spaces and parking space corners of the recognized parking space are recognized.

In this step, the parking space detection apparatus 102 may use a pre-trained neural network model to recognize the recognized parking spaces in each detection image frame and multiple parking space corners of each recognized parking space. Generally, the parking space is a rectangle or a parallelogram, and each recognized parking space has four parking space corners. In this step, one or more recognized parking spaces in each detection image frame, and four coordinates (x, y) of the four parking space corners of each recognized parking space are recognized. It should be understood that the coordinates (x, y) in the detection image have a one-to-one correspondence with real geographic coordinates of the vehicle in the environment, so that the real geographic coordinates of a position in the environment corresponding to the coordinates (x, y) can be determined based on the coordinates (x, y) in the detection image map.

In step S230, parking space verification is performed based on the parking space corners to determine a verified parking space from the one or more recognized parking spaces.

In this step, by using the parking space verification, an incorrectly recognized parking space that do not meet requirements may be deleted from the parking spaces recognized in the preceding steps, thereby avoiding resource waste caused by processing the incorrectly recognized parking space in subsequent steps, and improving the accuracy of parking space recognition.

In an embodiment, step S230 may include following steps.

In the first step, for each of the one or more recognized parking spaces, it is determined whether the parking space corners of the recognized parking space satisfy a parking space self-verification condition, and it is determined that the recognized parking space is a verification failed parking space if the parking space corners of the recognized parking space do not satisfy the parking space self-verification condition.

In an embodiment, the parking space self-verification condition includes one or a combination of multiple of the following conditions i to iv.

i. The quantity of the parking space corners of the recognized parking space conforms to a predetermined parking space corner quantity.

For example, it may be determined whether the recognized parking space has four corners, and if a recognized parking space does not have four corners, the verification of the recognized parking space fails.

ii. The parking space corners of the recognized parking space are all within a predetermined region of interest.

For example, it may be determined whether coordinates of each parking space corner of the recognized parking space are within the predetermined region of interest (ROI). The verification of the recognized parking space fails if at least one of the parking space corners of the recognized parking space is not within the region of interest. The region of interest may be defined by a field of view that the environment sensor of the vehicle is capable of collecting. For example, the region of interest may be a square of 20 meters*20 meters formed by extending 10 meters forward, backward, to the left, and to the right from the geometric centroid of the vehicle as the center point.

iii. a quadrilateral formed by the parking space corners of the recognized parking space is a convex quadrilateral.

Generally, a normal parking space should be a convex quadrilateral. If the quadrilateral formed by the parking space corners of the recognized parking space is a concave quadrilateral, it may be determined that the verification of the recognized parking space fails.

Figure 3:
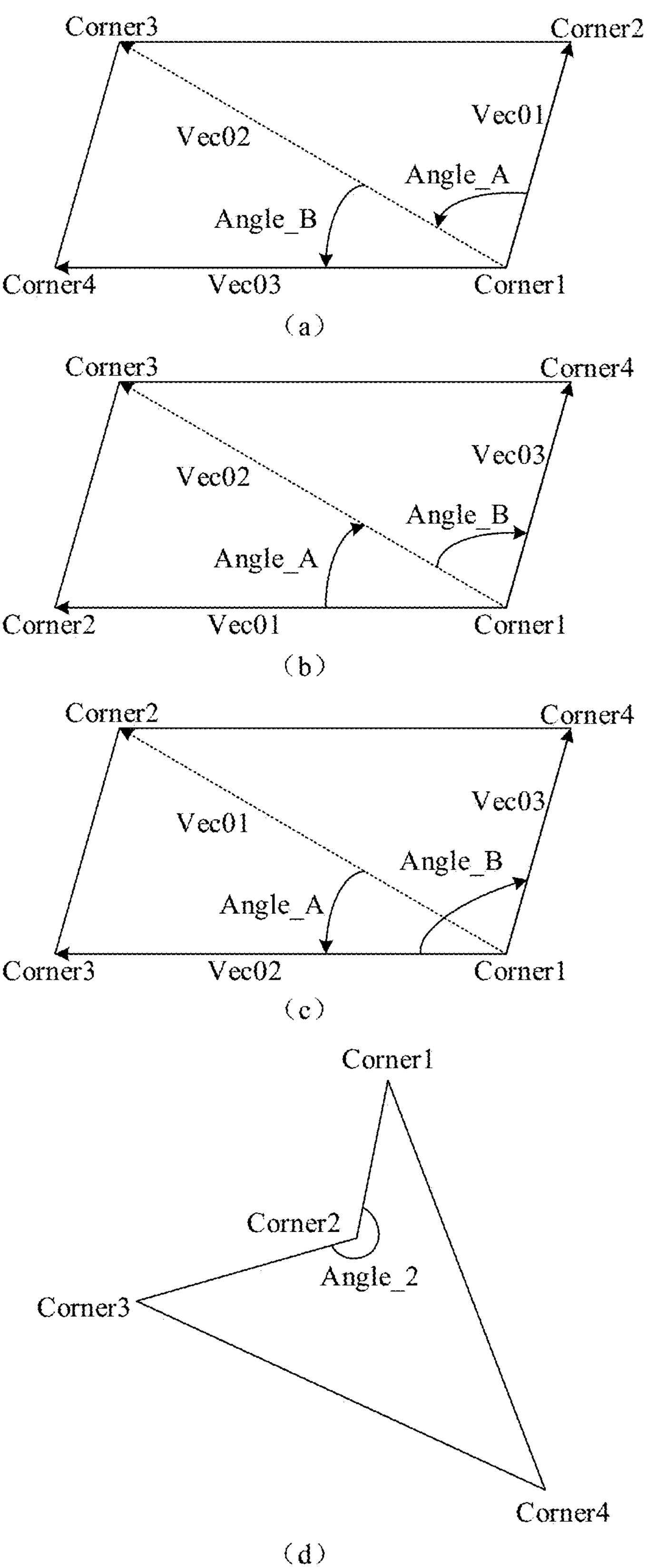
FIG. 3 is a schematic diagram of determining whether a quadrilateral formed by four parking space corners of a recognized parking space is a convex quadrilateral according to an embodiment.

For example, as shown in FIG. 3, it may be determined whether the quadrilateral formed by the four corners of the recognized parking space is a convex quadrilateral through the following steps a to f.

In step a, one of four parking space corners of a currently recognized parking space is select with reference to a current vehicle and marked as a first corner Corner1 (for example, a parking space corner closest to a "ground projection point of the center of the front bumper" of the current vehicle is used as a starting point, and is recorded as the first corner Corner1), and the remaining three parking space corners are randomly marked as a second corner Corner2, a third corner Corner3, and a fourth corner Corner4.

In step b, a first direction vector Vec01 from the first corner Corner1 to the second corner Corner2, a second direction vector Vec02 from the first corner Corner1 to the third corner Corner3, and a third direction vector Vec03 from the first corner Corner1 to the fourth corner Corner4 are respectively calculated.

In step c, a first rotation direction angle Angle_A from the first direction vector Vec01 to the second direction vector Vec02 and a second rotation direction angle Angle_B from the second direction vector Vec02 to the third direction vector Vec03 are respectively determined.

In step d, in a case that the first rotation direction angle Angle_A and the second rotation direction angle Angle_B have the same sign and are both positive, that is, in a case that the first rotation direction angle Angle_A and the second rotation direction angle Angle_B are in the same direction and are counterclockwise, for example, see the exemplary situation shown in (a) of FIG. 3, the order of the corners is marked as counterclockwise. In a case that the first rotation direction angle Angle_A and the second rotation direction angle Angle_B have the same sign and are both negative, that is, the first rotation direction angle Angle_A and the second rotation direction angle Angle_B are in the same direction and are clockwise, for example, see the exemplary situation shown in (b) of FIG. 3, the order of the corners is marked as clockwise.

In step e, in a case that the first rotation direction angle Angle_A and the second rotation direction angle Angle_B have different signs, for example, see the exemplary situation shown in (c) of FIG. 3, marks of the second corner Corner2 and the third corner Corner3 are exchanged, and steps b-d are performed again, and marks of the third corner Corner3 and the fourth corner Corner4 are exchanged and steps b-d are performed again, until the corners are successfully marked and ordered.

In Step f, after the marked corners are ordered, the four corners are successively connected according to the marked order of the corners to form a quadrilateral, and four interior angles of the quadrilateral are calculated. In a case that any one of the four interior angles is greater than 180 degrees, for example, see the exemplary situation shown in (d) of FIG. 3, the quadrilateral formed by the four corners of the recognized parking space is a concave quadrilateral, and in a case that the four interior angles are all less than 180 degrees, the quadrilateral formed by the four corners of the recognized parking space is convex quadrilateral.

In step iv, it is determined whether a geographic area of the quadrilateral formed by the parking space corners of the recognized parking spaces in the current detection image frame to which the recognized parking space belongs falls within a predetermined geographic area range.

The quadrilateral formed by the parking space corners of the parking space defines the boundary of the parking space. The geographical area of the quadrilateral represents the size of the parking space in the real three-dimensional space. If the parking space is recognized as too large or too small, the recognition of the parking space is wrong. Therefore, the predetermined geographical area range may be determined according to conventional sizes of the parking space, and if it is determined that the geographical area of the recognized parking space exceeds the predetermined geographical area range, it may be determined that the verification of the recognized parking space fails.

In the second step, for multiple recognized parking spaces in a same detection image frame, it is determined, according to a mutual relationship between the multiple recognized parking spaces, whether each of the multiple recognized parking spaces satisfies a parking space mutual verification condition, and recognized parking spaces that do not meet the parking space mutual verification condition are determined as verification failed parking spaces.

In an embodiment, the parking space mutual verification condition includes one or a combination of multiple of the following i and ii.

i. A parking space ID of the recognized parking space is not the same as parking space IDs of other recognized parking spaces in a same detection image frame.

This condition can ensure the uniqueness of the parking space in the same detection image frame by performing a parking space ID check, while avoiding duplication, and can be used to check whether the allocation of parking space IDs is abnormal.

ii. A difference between a geographic area of a quadrilateral formed by the parking space corners of the recognized parking space in the detection image frame and an average value of geographical areas of quadrilaterals formed by the parking space corners of other recognized parking spaces in the same detection image frame is within a predetermined difference threshold.

For example, in the same detection image frame, there may be multiple recognized parking spaces, and the sizes of multiple recognized parking spaces that are not much different from each other may be used as a template. In a case that the size of another recognized parking space is twice the size of this template or less than one-half of this template, it can be considered that the size of the recognized parking space is too different from the other recognized parking spaces, and the recognized parking space may be determined as a verification filed parking space. This condition determination may be performed only when there are more than three recognized parking spaces in the same detection image frame.

In the third step, for recognized parking spaces in two different detection image frames, it is determined whether the recognized parking spaces in the two different detection image frames meet an inter-frame verification conditions, and it is determined that the recognized parking spaces are verification failed parking spaces in a case that the recognized parking spaces do not meet the inter-frame verification condition.

In an embodiment, the inter-frame verification condition includes one or a combination of multiple of the following i and ii.

i. A time stamp of a current detection image frame to which the recognized parking space belongs is not the same as a time stamp of any historical detection image frame previous to the current detection image frame.

Self-verification of the timestamp of the current observation data is performed, and if the current timestamp is the same as the historical timestamp, the procedure returns immediately, avoiding repeated operations on the same observation data.

ii. The parking space semantic information of the recognized parking space in the current detection image frame to which the recognized parking space belongs is consistent with the parking space semantic information of the same recognized parking space in a historical detection image frame previous to the current detection image frame.

For the parking spaces having the same ID in different frames, some inherent attributes of the parking spaces, such as the parking space entrance side, the parking space depth and the parking space width, and the like, should be the same. This information may be used to determine invalid parking spaces. In the fourth step, a recognized parking space that meets the parking space self-verification condition, the parking space mutual verification condition and the inter-frame verification condition is determined as the verified parking space.

In this embodiment, by using the parking space self-verification condition, the parking space mutual verification condition and the inter-frame verification condition, intra-frame verification and inter-frame verification are performed on the parking spaces in each detection image frame are checked, so that detection accuracy of the parking spaces can be improved, and false detection of parking spaces can be avoided.

Step S240, the verified parking space in the multiple consecutive detection image frames are tracked by using a parking space tracking list, to record, in the parking space tracking list, a quantity of consecutive visible frames among the multiple consecutive detection image frames in which the verified parking space is recognized, and a quantity of consecutive missing frames among the multiple consecutive detection image frames in which the verified parking space is not recognized, and delete the verified parking space from the parking space tracking list in a case that the quantity of the consecutive missing frames of the verified parking space reaches a first frame quantity threshold.

Figure 4:
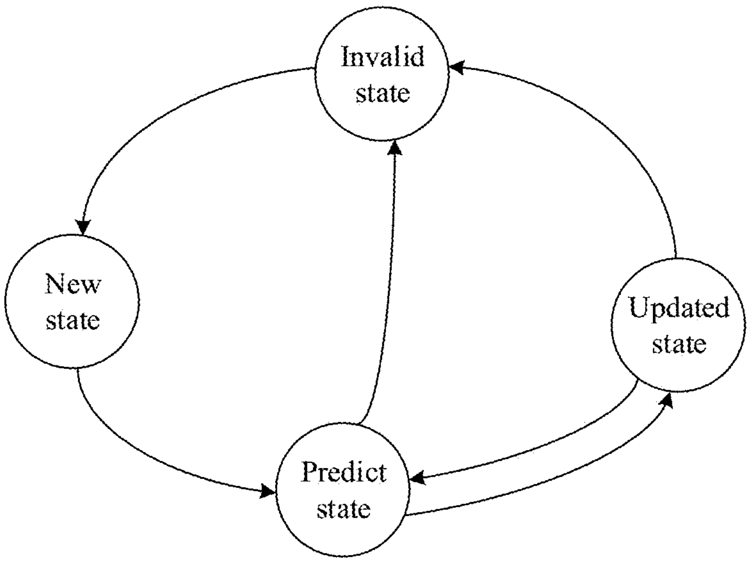
FIG. 4 is a schematic diagram of parking space state tracking according to an embodiment.

Further, in an embodiment, the tracking, by using a parking space tracking list, the verified parking space in the multiple consecutive detection image frames in step S240 further includes one additional step: recording a parking space state of each of the verified parking space in the parking space tracking list. As shown in FIG. 4, the parking space state may include a new state (New), a predict state (Predict), an updated state (Updated) and an invalid state (Invalid), and this additional step includes: for each of the verified parking space determined from the multiple consecutive detection image frames, the following steps are performed.

In the first step, in a case that the verified parking space is recognized for the first time in a detection image frame among the multiple consecutive detection image frames, the verified parking space is recorded in the parking space tracking list and the parking space state of the verified parking space is marked as the new state.

In the second step, in a case that the verified parking space is recognized again in any detection image frame subsequent to the detection image frame, the parking space state of the verified parking space is marked as the updated state.

In the third step, in a case that the verified parking space is not recognized in any detection image frame subsequent to the detection image frame, the parking space state of the verified parking space is marked as the predict state.

In the fourth step, in a case that a quantity of consecutive missing frames subsequent to the detection image frame in which the verified parking space in the predict state or the updated state is not recognized reaches the first frame quantity threshold M, the parking space state of the verified parking space is modified to the invalid state.

For example, the parking space state of the verified parking space may include four states: the new state, the predict state, the updated state, and the invalid state, and the parking space state of each verified parking space is recorded according to the rules of the above-noted four steps. The parking space tracking list may record a parking space ID of the verified parking space and the parking space attribute such as the parking space corners of the parking space in the latest detection image frame of the verified parking space. By using a parking space matching method as described in the following that utilizes an intersection-over-union between verified parking spaces in two detection image frames to determine whether the verified parking spaces in the two detection image frames are the same parking space, the verified parking spaces in the current detection image frame may be matched with the verified parking spaces in the previous detection image frame, so as to track the quantity of visible frames and the quantity of missing frames of each verified parking space, and determine the quantity of consecutive visible frames and the quantity of consecutive missing frames of each verified parking space.

The parking space ID of each verified parking space is recorded and tracked in the parking space tracking list, and the uniqueness of the parking space ID is required. Available parking space IDs are recycled. If the state of a verified parking space in the parking space tracking list becomes Invalid, the parking space ID occupied by the verified parking space is removed from the parking space tracking list and become an unoccupied parking space ID. When a new verified parking space appears subsequently, an unoccupied parking space ID is assigned to the new verified parking space according to the value of the parking space ID. In the parking space tracking list, the maximum number of parking space IDs that can be maintained may be set.

For example, assuming that five verified parking spaces are recognized in a first detection image frame, and the five verified parking spaces appear for the first time, the five verified parking spaces are recorded as parking space IDs 1, 2, and 3, 4, and 5 in the parking space tracking list, and the parking space states of the five verified parking spaces are marked as New. When it comes to a second detection image frame, if five verified parking spaces are recognized in the second detection image frame, the parking space states of the five verified parking spaces in the parking space tracking list are marked as Predict, and the five verified parking spaces in the second detection image frame are matched with the five verified parking spaces recorded in the parking space tracking list (the five verified parking spaces in the first detection image frame). For example, the first four verified parking spaces in the second detection image frame successfully match the four verified parking spaces with parking space IDs 1, 2, 3, and 4 in the parking space tracking list, the four verified parking spaces with parking space IDs 1, 2, 3, and 4 in the parking space tracking list are updated to the corresponding first four verified parking spaces in the second detection image frame, and the parking space states of the four verified parking spaces with parking space IDs of 1, 2, 3, and 4 in the parking space tracking list are marked as Updated. The fifth verified parking space in the second detection image frame fails in matching (considered to be the first occurrence), the fifth verified parking space is added to the parking space tracking list and assigned a new parking space ID 6, and the parking space state of the fifth verified parking space is marked as New. That is, the parking space states of the verified parking spaces with the parking space IDs 1, 2, 3, and 4 in the parking space tracking list are Updated, and the parking space state of the verified parking space with the parking space ID 5 is Predict, and the parking space state of the verified parking space with the parking space ID 6 is New. In a case that any verified parking space is visible in two consecutive detection image frames (N=2), parking space semantic information is determined and outputted for the verified parking space in each subsequent frame, until the verified parking space is deleted from the parking space tracking list. In a case that any verified parking space is invisible (missing) for 3 consecutive frames (M=3), the parking space state of the verified parking space is set to Invalid (that is, the verified parking space is deleted from the parking space tracking list).

In a case that the speed of the vehicle 10 is slightly high, the position of the same parking space in different detection image frames may change greatly. In the above-mentioned embodiment, when tracking the verified parking space in the multiple consecutive detection image frames, the verified parking spaces in two consecutive detection image frames (a current detection image frame and a historical detection image frame recorded in the parking space tracking list) are matched with each other, to determine whether a verified parking space in the latter detection image frame and a verified parking space in the former detection image frame are the same parking space. In an embodiment, the tracking, by using a parking space tracking list, the verified parking space in the multiple consecutive detection image frames further includes another step: determining, by using an intersection-over-union (IOU) between verified parking spaces in two detection image frames, whether the verified parking spaces in the two detection image frames are the same parking space.

In an embodiment, the other step may include following steps.

In the first step, the intersection over union (IOU) between each of the verified parking space in a former detection image frame among the two detection image frames and each of the verified parking space in a latter detection image frame among the two detection image frames is calculated.

In an embodiment, the first step includes following steps. In the first step, the two detection image frames are superimposed to obtain a superimposed detection map.

Figure 5:
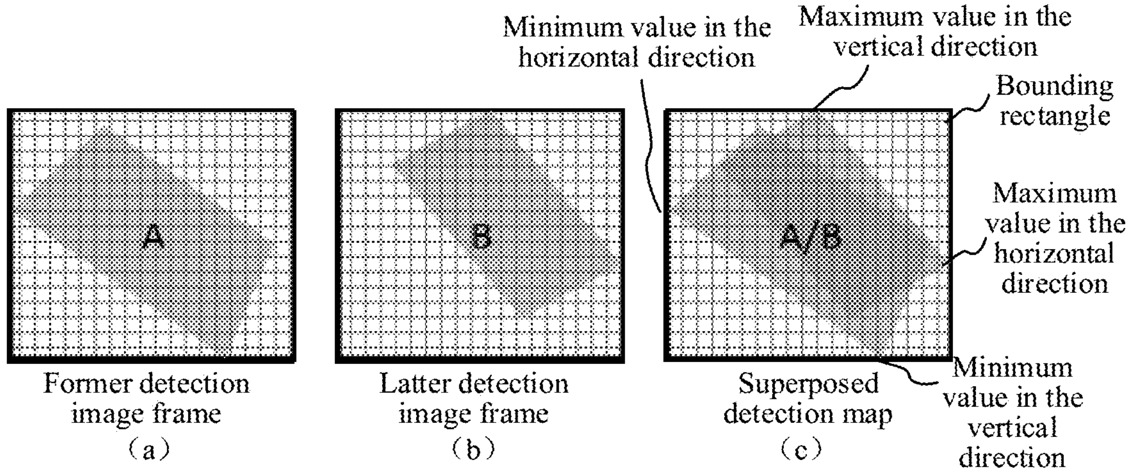
FIG. 5 is a schematic diagram of calculating an intersection over union between a first verified parking space A and a second verified parking space B according to an embodiment.

Referring to FIG. 5, the former detection image frame shown in FIG. 5(*a*) may be superimposed with the latter detection image frame shown in FIG. 5(*b*) to obtain the superimposed detection map shown in FIG. 5(*c*).

In the second step, for a first verified parking space A among the verified parking space in the former frame among the two detection image frames and a second verified parking space B among the verified parking space in the latter detection image frame among the two detection image frames, the following steps a to d are performed to calculate the intersection over union between first verified parking space A and the second verified parking space B.

In step a, a maximum value and a minimum value of the parking space corners of the first verified parking space A and the parking space corners of the second verified parking space B in a vertical direction in the superimposed detection map are used as an upper boundary and a lower boundary of a bounding rectangle respectively, a maximum value and a minimum value of the parking space corners of the first verified parking space A and the parking space corners of the second verified parking space B in a horizontal direction in the superimposed detection map are used as a left boundary and a right boundary of the bounding rectangle respectively, to determine the bounding rectangle of the parking space corners of the first verified parking space A and the parking space corners of the second verified parking space A in the superposed detection map.

For example, the first verified parking space A includes four parking space corners, and the second verified parking space B includes four parking space corners, then among the eight corners of the two parking spaces, the maximum and minimum values of the coordinates in the vertical direction, and the maximum and minimum values of the coordinates in the horizontal direction are searched for, the upper boundary is formed at the maximum value in the vertical direction, the lower boundary is formed at the minimum value in the vertical direction, the right boundary is formed at the maximum value in the horizontal direction, and the left boundary is formed at the minimum value in the horizontal direction, so that the bounding rectangle of the two parking spaces enclosed by the four boundaries are generated. The generated bounding rectangle may be seen in FIG. 5(*c*), where the outermost black frame in FIG. 5(*c*) represents the bounding rectangle of the first verified parking space A and the second verified parking space B.

In step b, the intersection over union between the first verified parking space and the second verified parking space is determined to be zero in a case that a length of at least one side of the bounding rectangle is greater than a predetermined side length threshold.

For example, the predetermined side length threshold may be the sum of the longest side of the first verified parking space and the longest side of the second verified parking space. When any side of the bounding rectangle of the two parking spaces exceeds the predetermined side length threshold, it may be determined that there is no overlap or there is little overlap between the two parking spaces, and the intersection over union between the first verified parking space and the second verified parking space is determined to be zero, to avoid subsequent operations.

In step c, a grid map is generated by using the bounding rectangle as a boundary, and a quantity of grids occupied by the first verified parking space in the grid map and a quantity of grids occupied by the second verified parking space in the grid map are determined, in a case that the length of each side of the bounding rectangle is less than or equal to the predetermined side length threshold.

When determining the quantity of occupied grids, when a covered area of a grid is larger than a predetermined area threshold, the grid is considered to be occupied. The area threshold may be, for example, ⅔ of the area of the grid.

In step d, the intersection over union between the first verified parking space and the second verified parking space is calculated based on the quantity of grids occupied by the first verified parking space in the grid map and the quantity of grids occupied by the second verified parking space in the grid map.

For example, the intersection-over-union between the first verified parking space A and the second verified parking space B can be calculated by the following equation:

$$\text{Intersection Over Union} = \frac{\text{Quantity of grids occupied by } A + \text{Quantity of grids occupied by } B - \text{Quantity of grids occupied by } A \cup B}{\text{Quantity of grids occupied by } A \cup B}$$

where A U B represents the union of the first verified parking space A and the second verified parking space B.

In one step, a verified parking space among the verified parking space in the latter detection image frame and a verified parking space among the verified parking space in the former detection image frame between which the intersection over union is greater than or equal to a predetermined intersection over union threshold are determined as the same detection image frame.

In another step, a verified parking space among the verified parking space in the latter detection image frame and a verified parking space among the verified parking space in the former detection image frame between which the intersection over union is less than the predetermined intersection over union threshold are determined as different detection image frames.

For example, the predetermined intersection over union threshold may be 60%. In a case that the intersection over union is greater than or equal to 60%, it may be determined that the first verified parking space and the second verified parking space are the same parking space; and in a case that the intersection over union is less than 60%, it may be determined that the first verified parking space and the second verified parking space are different parking spaces.

In step S250, parking space semantic information of the verified parking space is determined and outputted based on the parking space corners of the verified parking space, if the quantity of consecutive visible frames of the verified parking space in the parking space tracking list reaches a second frame quantity threshold.

In an embodiment, the parking space semantic information may include one or more of a parking space corner position, a parking space corner order, a main road direction, a parking space entrance side, a parking space depth, a parking space width, a parking space orientation, a parking space direction type, and a parking space available parking area.

In an embodiment, when the parking space semantic information includes the parking space corner position, the method further includes:

performing smoothing processing on the parking space corner position of the verified parking space in a current detection image frame based on the parking space corner position of the verified parking space in a previous detection image frame by using a Kalman filter, to determine and output a smoothed parking space corner position as the parking space corner position of the verified parking space in the current detection image frame.

In this embodiment, the Kalman filter is used to smooth the parking space corner position (coordinates), the parking space added to the parking space tracking list is used to update a parameter of the Kalman filter, and the parking space corner position information outputted for each current detection image frame is predicted and outputted by using the parameter of the Kalman filter of the historical detection image frame. By adjusting the parameter proportion of the predicted value and the observed value, the jitter of the corner position processed by using the Kalman filter can be greatly reduced, ensuring that the outputted parking space corner position is smooth.

The Kalman filter performs the smoothing processing of the following steps a to c on the parking space corner coordinates in each current detection image frame to obtain the smoothed parking space corner coordinates.

In step a, posterior estimated values of the parking space corner coordinates in a previous detection image frame is used to predict predicted values of corresponding parking space corner coordinates in a current detection image frame as prior estimated values of the current detection image frame, and posterior error values of the parking space corner coordinates in the previous detection image frame is used to predict predicted error values of the corresponding parking space corner coordinates in the current detection image frame as prior error values of the current detection image frame.

In step b, a Kalman gain is calculated based on the prior error values of the current detection image frame.

In step c, the posterior estimated value of the current detection image frame is calculated based on the Kalman gain calculated in step b, observed values of the parking space corner coordinates in the current detection image frame, and the prior estimate values of the current detection image frame, as the parking space corner coordinates in the current detection image frame after smoothing.

In an embodiment, when in a case that the parking space semantic information includes the parking space corner order, the determining and outputting, based on the parking space corners of the verified parking space, parking space semantic information of the verified parking space in step S250 may include step S251 determining and outputting the parking space corner order of the verified parking space based on the parking space corners of the verified parking space. The steps a-e in the aforementioned method of determining whether the quadrilateral formed by the four corners of the recognized parking space is a convex quadrilateral may be used to determine the parking space corner order of the four corners of each verified parking space. That is, for each verified parking space for which it has been determined whether the verified parking space is a convex quadrilateral in S230, the parking space corner order of the four corners of the verified parking space is determined. Then in S250, the determined parking space corner order of the four corners may be directly obtained.

In the aforementioned implementation, in a case that the parking space semantic information includes the parking space corner order, the parking space corner order of the verified parking space in each detection image frame may be determined. However, the correspondence between the parking space corner orders of the same parking space in different detection image frames is unclear. In an embodiment, in a case that the parking space semantic information includes the parking space corner order, the method may further include: matching the parking space corner order of the verified parking space in a current detection image frame with the parking space corner order of the verified parking space in a previous detection image frame, to cause the parking space corner order in the current detection image frame to be consistent with the parking space corner order in the previous detection image frame.

After each verified parking space in the latter detection image frame of the two detection image frames is successfully matched with one verified parking space in the former detection image frame in the two detection image frames by using the parking space matching method, it is also necessary to make the parking space corner order of each verified parking space in the latter detection image frame to be consistent with the parking space corner order of the same verified parking space in the former detection image frame. In this embodiment, by matching the parking space corner order between frames, it can be ensured that the parking space corner order of the same parking space between the two detection image frames remains consistent.

Taking each parking space including four corners as an example, in a case of determining that the first verified parking space A in the former detection image frame and the second verified parking space B in the latter detection image frame are the same parking space, the parking space corner order of the second verified parking space B may be made to be consistent with the parking space corner order of the first verified parking space A through the method for matching parking space corner orders in the following steps a-c.

In step a, an Euclidean distance between each of the four corners Corner1-4 of the first verified parking space A and each of the four corners Corner1'-4' of the second verified parking space B is calculated, to obtain a total of sixteen Euclidean distance values between sixteen pairs of parking space corners as follows:

(Corner1 of parking space A-Corner1' of parking space B), (Corner2 of parking space A-Corner1' of parking space B), (Corner1 of parking space A-Corner2' of parking space B), (Corner2 of parking space A-Corner2' of parking space B), (Corner1 of parking space A-Corner3' of parking space B), (Corner2 of parking space A-Corner3' of parking space B), (Corner1 of parking space A-Corner4' of parking space B), (Corner2 of parking space A-Corner4' of parking space B), (Corner3 of parking space A-Corner1' of parking space B), (Corner4 of parking space A-Corner1' of parking space B), (Corner3 of parking space A-Corner2' of parking space B), (Corner4 of parking space A-Corner2' of parking space B), (Corner3 of parking space A-Corner3' of parking space B), (Corner4 of parking space A-Corner3' of parking space B), (Corner3 of parking space A-Corner4' of parking space B), (Corner4 of parking space A-Corner4' of parking space B).

In step b, corresponding parking space corners are matched by using the Hungarian matching algorithm.

By using the Hungarian matching algorithm, it may be determined that each of the four parking space corners corner1'-4' of the second verified parking space B is the same parking space corner as which one of the four parking space corners corner1-4 of the first verified parking space A. The Hungarian matching algorithm is conventional technology and is not described in detail herein.

In step c, the order of the parking space corners of the second verified parking space B is arranged according to the order of the parking space corners of the first verified parking space A based on the matching result.

For example, if the parking space corners corner1', corner2', corner3', and corner4' of the second verified parking space B and the parking space corners corner4, corner1, corner2, and corner3 are respectively determined to be the same parking space corners, the parking space corners corner1', corner2', corner3' and corner4' of the second verified parking space B are respectively marked as corner4, corner1, corner2 and corner3, so that the parking space corner order of the second verified parking space B is consistent with the parking space corner order of the first verified parking space A.

Further, in an embodiment, in a case that the parking space semantic information includes the parking space corner order, the determining and outputting, based on the parking space corners of the verified parking space, parking space semantic information of the verified parking space in step S250 further includes: configuring the parking space corner order based on user input.

In this embodiment, the parking space corner order may be configured according to the needs of the user. For example, after the parking space entrance side is determined, the parking space corners at both ends of the parking space entrance side may be marked as a first corner and a second corner respectively, which includes 0-1 corner, the parking space corner order on the left side of the current vehicle is clockwise, and the parking space corner order on the right side of the current vehicle is counterclockwise.

In an embodiment, in a case that the parking space semantic information includes the main road direction, the determining, based on the parking space corners of the verified parking space, parking space semantic information of the verified parking space in step S250 may include the following step S252.

Figure 6:
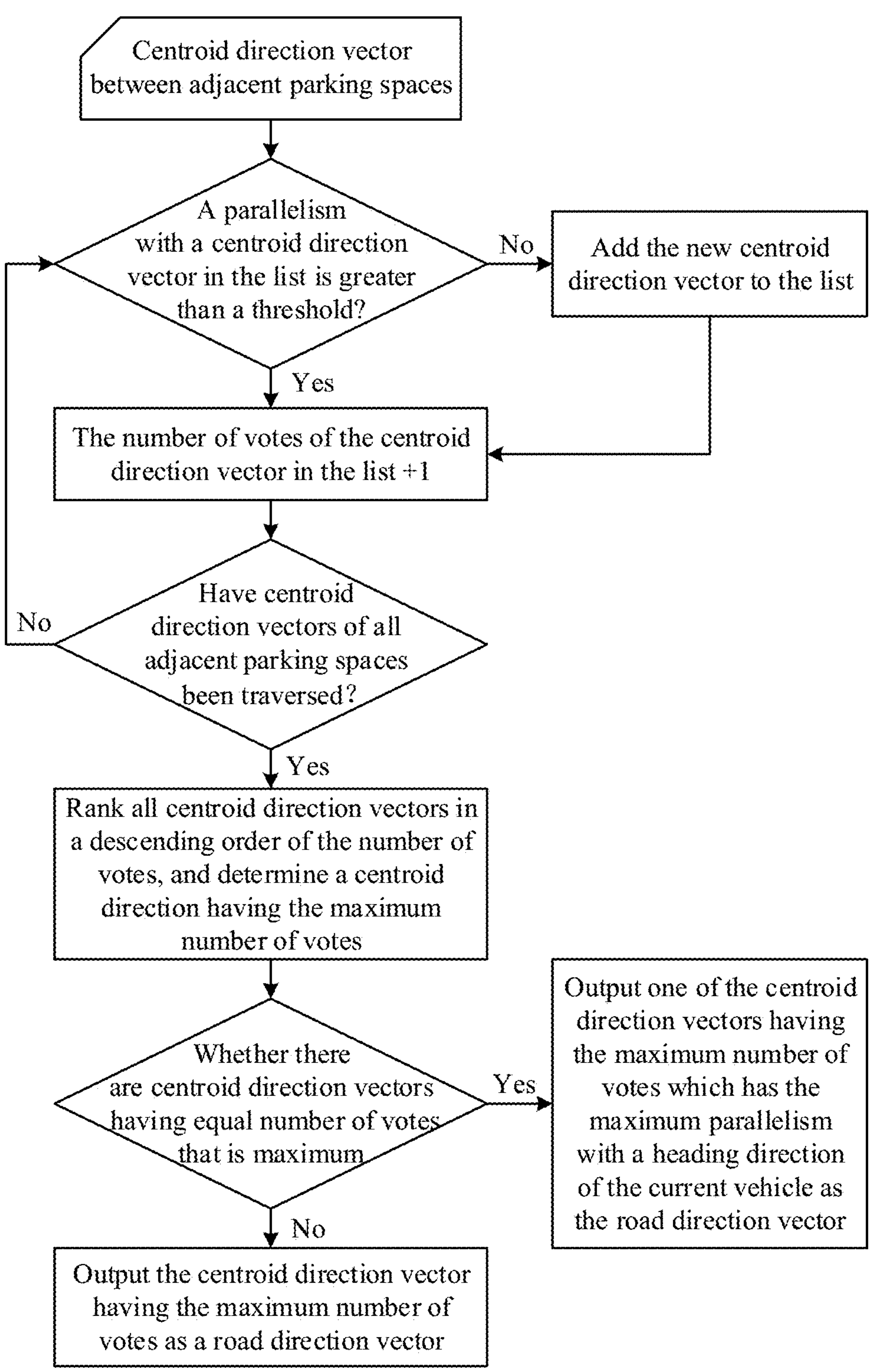
FIG. 6 is a flow chart of determining a main road direction according to an embodiment.

In step S252, as shown in FIG. 6, the following steps a-d are performed for any current detection image frame to determine the main road direction in the current detection image frame.

In step a, one or more pairs of adjacent parking spaces in the current detection image frame are recognized.

For example, a Euclidean distance between the parking space corners of every two verified parking spaces in the current detection image frame may be calculated. For example, for any two verified parking spaces B1 and B2 in the current detection image frame, each verified parking space has four corners, the four corners of the verified parking space B1 and the four corners of the verified parking space B2 are respectively paired in pairs, and sixteen Euclidean distances between sixteen pairs of corners may be calculated. Assuming that the coordinates of two corners in each pair of corners are (x1, y1) and (x2, y2), the Euclidean distance d between each pair of corners may be calculated by the following equation:

$$d=\sqrt{(x_2-x_1)^2+(y_2-y_1)^2}.$$

Then, the calculated sixteen Euclidean distances may be arranged in descending order of the corner distances.

It is determined whether two minimum Euclidean distances are less than a distance threshold. If any one of the two minimum Euclidean distances is greater than the distance threshold, the current two verified parking spaces B1 and B2 are not adjacent to each other. If the two minimum Euclidean distances are both smaller than the distance threshold, the current two verified parking spaces B1 and B2 are adjacent to each other. For example, the distance threshold may be 20 cm.

In this way, it may be determined whether every two verified parking spaces in the current detection image frame are adjacent to each other, thereby determining one or more pairs of adjacent parking spaces in the current detection image frame.

Figure 7:
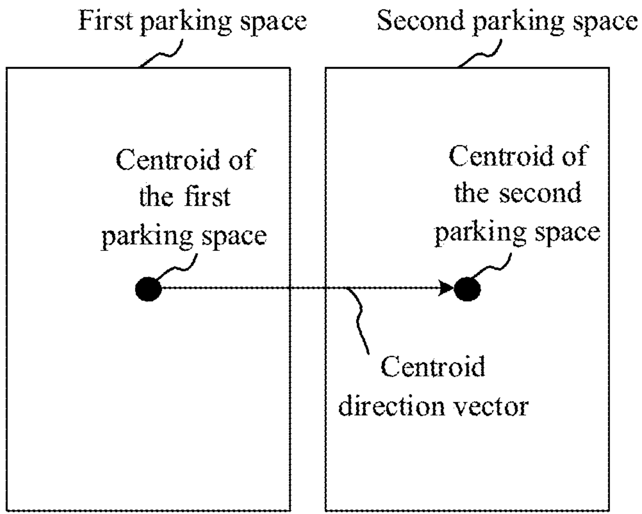
FIG. 7 is a schematic diagram of a centroid direction vector between a first parking space and a second parking space according to an embodiment.

In step b, for each of the one or more pairs of adjacent parking spaces, a centroid direction vector from a centroid of a first parking space of the pair of adjacent parking spaces to a centroid of a second parking space of the pair of adjacent parking spaces, to obtain one or more centroid direction vectors;

The centroid direction vector between the first parking space and the second parking space may be as shown in FIG. 7. When determining the centroid direction vector in this step, adjacent sides between the first parking space and the second parking space may further be recorded for use when necessary.

In step c, the one or more centroid direction vectors are classified to determine one or more centroid direction classes.

In this step, each centroid direction vector may be classified. For example, as shown in FIG. 6, a list of centroid direction vectors may be created, and each of the one or more centroid direction vectors is matched with the centroid direction vectors in the list. If a parallelism between a current centroid direction vector among the one or more centroid direction vectors and a certain centroid direction vector in the list is greater than or equal to a set parallelism threshold (the included angle is less than or equal to a set angle threshold), the current centroid direction vector may be determined as belonging to a centroid direction class represented by the certain centroid direction vector in the list, and one is added to the number of votes of the certain centroid direction vector in the list. If the parallelism between the current centroid direction vector among the one or more centroid direction vectors and the centroid direction vector in the list is greater than or equal to the set parallelism threshold (the included angle is greater than the set angle threshold), the current centroid direction vector does match the centroid direction vector in the list, or there is no centroid direction vector in the list (in the case of matching the first centroid direction vector), the current centroid direction vector is added to the list as a new centroid direction vector until all centroid direction vectors are matched. For example, the set angle threshold may be 15°. The number of votes of each centroid direction vector in the list indicates centroid direction vectors of the centroid direction class represented by the centroid direction vector in the list.

In step d, the main road direction is determined based on one of the centroid direction vectors corresponding to one of the centroid direction classes having the greatest total quantity of centroid direction vectors.

For example, after completing the matching of all centroid direction vectors, the centroid direction vectors in the list may be sorted according to the number of votes to determine the centroid direction vector with the maximum number of votes. If there is only one centroid direction vector with the maximum number of votes, the centroid direction vector with the maximum number of votes is outputted as the road direction vector, and a direction indicated by the road direction vector is the main road direction. When there are multiple centroid direction vectors with equal number of votes that is the maximum, among the multiple centroid direction vectors of the equal votes, one of the multiple centroid direction vectors with the highest parallelism to a heading direction of the current vehicle (that is, having the smallest angle relative to the heading direction of the current vehicle) is outputted as the road direction vector, and the direction indicated by the road direction vector is the main road direction.

In an embodiment, after the main road direction is determined, in a case that the parking space semantic information in step S250 includes the parking space entrance side, the determining, based on the parking space corners of the verified parking space, parking space semantic information of the verified parking space includes the following step S253*a* and S253*b*.

In step S253*a*, the four corners of the verified parking space are sequentially connected according to the determined parking space corner order, so as to determine four sides of the verified parking space.

In step S253*b*, based on the main road direction, two sides with the highest parallelism to the main road direction are selected from the determined four sides as two candidate sides for the parking space entrance side, and one of the two candidate sides having the shortest Euclidean distance to the geometric centroid of the current vehicle is used as the parking space entrance side.

Figure 8:
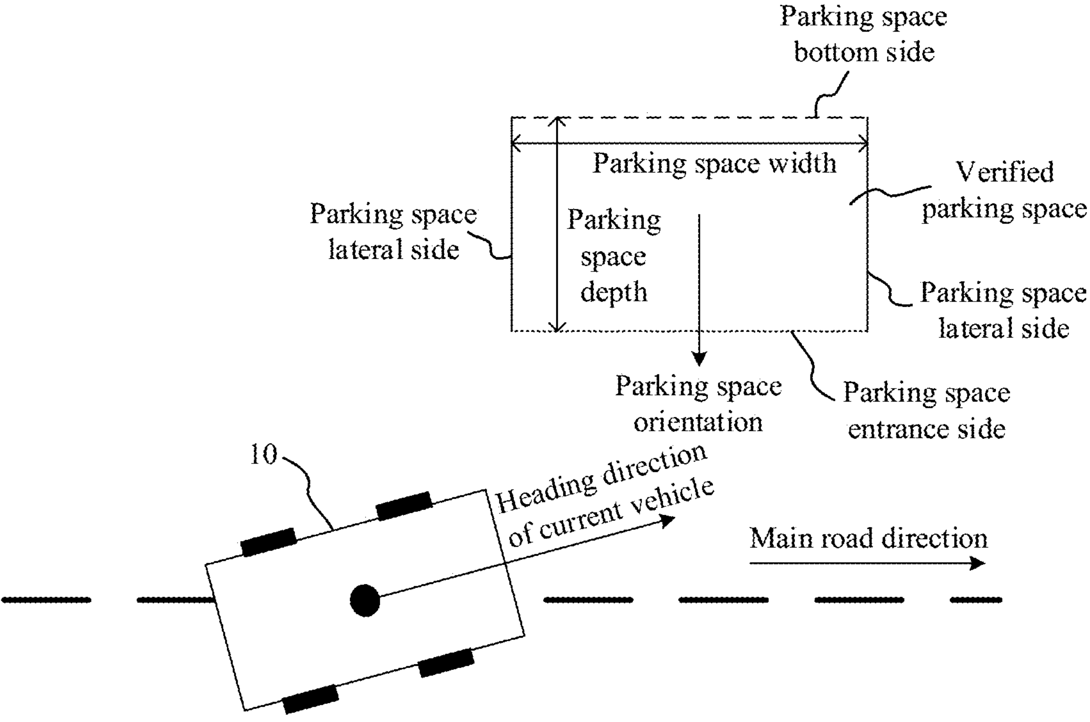
FIG. 8 is a schematic diagram of determining a parking space entrance side, a parking space depth, a parking space width, and a parking space orientation of a verified parking space according to an embodiment.

As shown in FIG. 8, the side represented by a dotted line and the side represented by a dashed line with the highest parallelism to the main road direction are two candidate sides, and the side represented by the dotted line that is closer to the geometric centroid of the current vehicle is selected as the parking space entrance side. The side represented by the dashed line opposite to the parking space entrance side is the parking space bottom side.

In an embodiment, as shown in FIG. 8, after the parking space entrance side is determined, in a case that the parking space semantic information includes the parking space depth, the determining, based on the parking space corners of the verified parking space, parking space semantic information of the verified parking space in step S250 includes: determining a segment distance between two parallel lines formed by the parking space entrance side of the verified parking space and the parking space bottom side of the verified parking space opposite to the parking space entrance side as the parking space depth of the verified parking space.

In an embodiment, as shown in FIG. 8, after the parking space entrance side is determined, in a case that the parking space semantic information includes the parking space width, the determining, based on the parking space corners of the verified parking space, parking space semantic information of the verified parking space in step S250 includes: determining a segment distance between two parallel lines formed by two sides adjacent to the parking space entrance side of the verified parking space as the parking space width of the verified parking space.

In an embodiment, as shown in FIG. 8, after the parking space entrance side is determined, in a case that the parking space semantic information includes the parking space orientation, the determining, based on the parking space corners of the verified parking space, parking space semantic information of the verified parking space in step S250 includes: determining an outward direction perpendicular to the parking space entrance side the verified parking space (a direction from the bottom side to the parking space entrance side) as the parking space orientation of the verified parking space.

Figure 9:
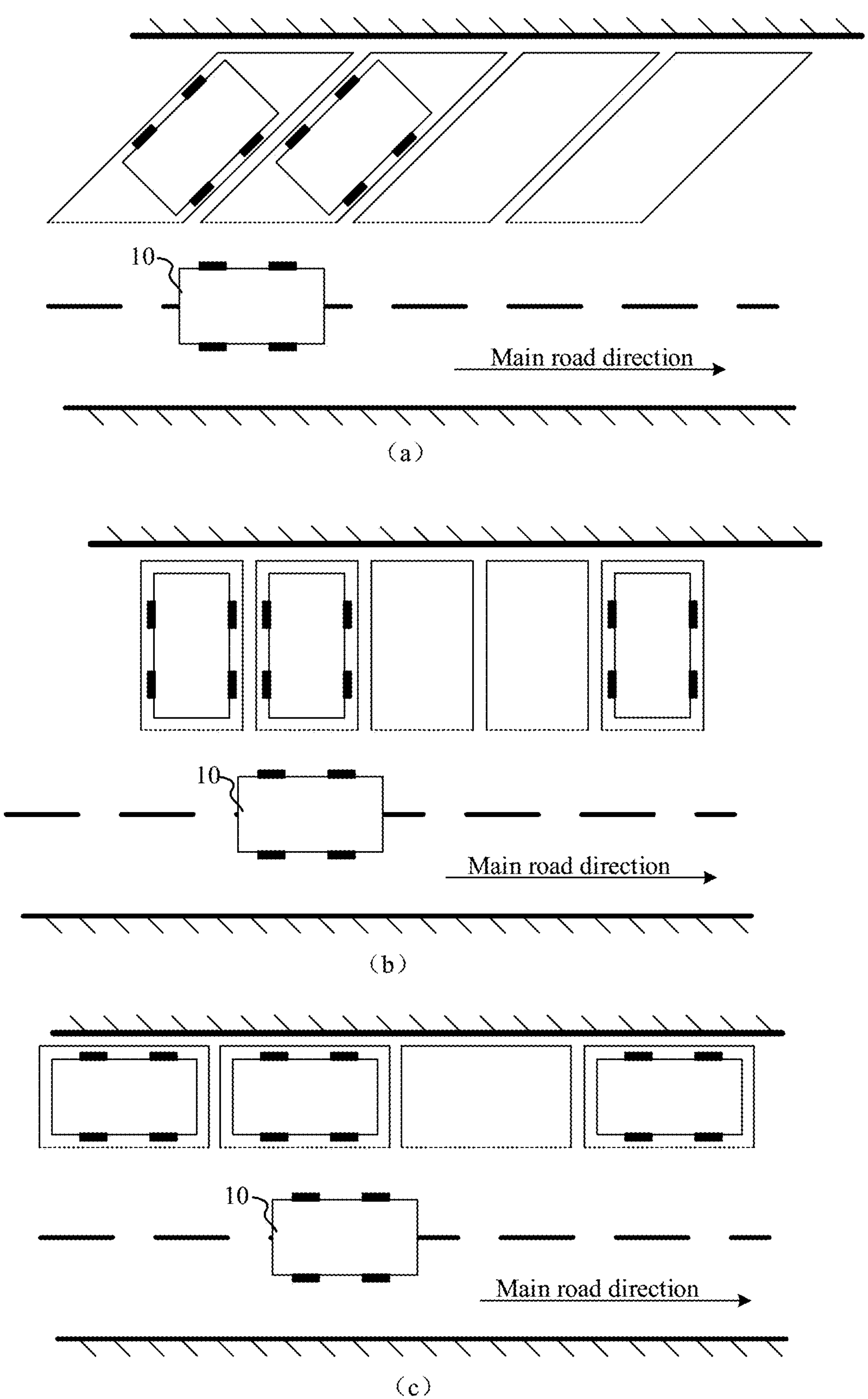
FIG. 9 is a schematic diagram of an inclined parking space, a perpendicular parking space and a parallel parking space according to an embodiment.

In an embodiment, as shown in FIG. 9, after the parking space entrance side is determined, in a case that the parking space semantic information includes the parking space direction type, the determining, based on the parking space corners of the verified parking space, parking space semantic information of the verified parking space in step S250 may include following steps S254*a* to S254*b*.

In step S254*a*, it is determined whether the verified parking space is an inclined parking space based on the four interior angles of a quadrilateral formed by the four corners of the verified parking space. In a case that the four interior angles are all within a predetermined interior angle range, it is determined the verified parking space is not the inclined parking space; and in a case that at least one of the four interior angles exceeds the predetermined interior angle range, it is determined that the verified parking space is the inclined parking space. The predetermined interior angle threshold may be, for example, greater than or equal to 75° and less than or equal to 105°.

In step S254*b*, if it is determined in step S254*a* that the verified parking space is not the inclined parking space, in a case that the parking space entrance side of the verified parking space is one of two shorter sides of the quadrilateral, it is determined that the verified parking space is a vertical parking space, and in a case that the parking space entrance side of the verified parking space is one of the two longer sides of the quadrilateral, it is determined that the verified parking space is a parallel parking space.

The parking space direction type may include the inclined parking space, the perpendicular parking space, and the parallel parking space. The inclined parking space refers to a parking space of which the parking space orientation forms an inclined angle with the main road direction. For example, an example of the inclined parking space is given in (a) of FIG. 9. A vertical parking space refers to a parking space of which the parking space orientation is substantially perpendicular to the main road direction. For example, an example of the vertical parking space is given in (b) of FIG. 9. The parallel parking space refers to a parking space of which the parking space orientation is substantially parallel to the main road direction. For example, an example of the parallel parking space is given in (c) of FIG. 9.

In some cases, there may be obstacles such as wheel bars or pedestrians in the parking space. When the current vehicle needs to be parked, it may be necessary to output an available parking area of a parking space to ensure that current vehicle is safely parked. In an embodiment, in a case that the parking space semantic information includes the parking space available parking area, the determining, based on the parking space corners of the verified parking space, parking space semantic information of the verified parking space in step S250 may include following steps S255*a* to S255*d*.

In step S255*a*, a total parking area of the verified parking space is determined based on the parking space corners of the verified parking space.

The total parking area is a parking area of the verified parking spaces in a case that no obstacle exists. The total parking area may be, for example, a quadrilateral area enclosed by the four corners of the verified parking spaces in the parking space corner order.

In step S255*b*, it is detected whether there is an obstacle in the verified parking space.

In an embodiment, the obstacle may include a fixed obstacle and/or a movable obstacle.

An obstacle fixed on the verified parking space, such as a limit block/a stopper rod, and the like, is the fixed obstacle. An obstacle that is not fixed on the verified parking space, such as a pedestrian, an animal, garbage, a vehicle and other objects that interfere with parking, is the movable obstacle.

In step S255*c*, the total parking area is determined as the available parking area of the verified parking space in a case that there is no obstacle in the verified parking space.

In step S255*d*, in a case that there is an obstacle in the verified parking space, an unavailable parking area occupied by the obstacle is subtracted from the total parking area, to obtain the available parking area of the verified parking space.

In a case that the obstacle may include the fixed obstacle and/or the movable obstacle:

in a case of determining that there is a fixed obstacle in the verified parking space, the unavailable parking area of the fixed obstacle may be calculated according to a predetermined calculation rule corresponding to the fixed obstacle. For example, for a stopper rod, an area between a straight line where the stopper rod is located and that is parallel to the bottom edge and the bottom edge is determined as the unavailable parking area and is subtracted from the total parking area; and in a case of determining that there is a movable obstacle in the verified parking space, an intersecting side that is among sides of a polygon defined by the parking space corners of the verified parking space and that intersects with the movable obstacle and an interior corner which is a corner of the movable obstacle that is located within the polygon defined by the parking space corners of the verified parking space are determined, an unavailable parking area calculation table is searched by using the intersecting side and the interior corner for a target calculation rule corresponding to the intersecting side and the interior corner, and the unavailable parking area of the movable obstacle is calculated by using the target calculation rule.

It should be understood that the unavailable parking area that needs to be subtracted from the total parking area is a total area obtained by superimposing the unavailable parking areas of all detected fixed obstacles and/or movable obstacles (that is, the union of the unavailable parking area of all obstacles).

The movable obstacle may be in various postures, and may have various relative positional relationships with the verified parking space. For example, image recognition may be used to detect a detection box (a two-dimensional bounding box) that defines the area where the movable obstacle is located, and the detection box is used to represent the movable obstacle to determine the relative positional relationship between the movable obstacle and the verified parking space.

In this way, the intersecting side that is among the four sides of the quadrilateral defined by the four parking space corners of the verified parking space and that intersects with the detection box, and the interior corner that is among the four corners of the detection box that is located in the quadrilateral defined by the four parking space corners of the verified parking space are determined.

FIG. 10 shows a possible exemplary intersection posture of the detection box representing the movable obstacle and the quadrilateral defined by the four parking space corners of the verified parking space. It should be understood that the intersection posture shown in FIG. 10 is only an example and not exhaustive. The white filled frame represents the verified parking space, the side indicated by the dotted line represents the parking space entrance side of the verified parking space, and the gray filled frame represents the detection box where the movable obstacle is located. For example, the following calculation rules may be recorded in the unavailable parking area calculation table.

(1) In a case that any one of the following conditions a-c is met, the unavailable parking area of the movable obstacle is calculated as equal to the total parking area (that is, the available parking area is determined to be zero, in this case, the unavailable parking area may not be calculated, and it is directly determined that the verified parking space is not available).

a. The quantity of intersecting sides is greater than or equal to three.

b. One of the intersecting sides is the parking space entrance side.

c. A distance between any one of the interior corners and any one of the sides of the quadrilateral exceeds a side distance threshold (for example, ⅕ of the parking space width) or a distance between any one of the interior corners to a bottom side of the quadrilateral exceeds a bottom distance threshold (for example, ⅕ of the parking space depth).

(2) In a case that none of the above a-c conditions is met, the unavailable parking area is calculated according to a corresponding one of the following calculation rules d-k.

d. In a case that the quantity of intersecting sides equals to zero and the quantity of interior corners equals to four, a distance between each interior corner and the bottom side of the quadrilateral is calculated, and in the total parking area, an area from a straight line that is parallel to the bottom side and where the interior corner with the greatest distance is located to the bottom side is determined as the unavailable parking area.

e. In a case that the quantity of the intersecting sides equals to one and the quantity of the interior corners equals to zero, the quantity of the unavailable parking area determined to be zero.

f. In a case that the quantity of the intersecting sides equals to one and the quantity of the interior corners equals to one, an area from a straight line that is parallel to the intersecting side and where the interior corner is located to the intersecting side in the total parking area is determined as the unavailable parking area.

g. In a case that the quantity of the intersecting sides equals to one and the quantity of the interior corners equals to two, a distance from each interior corner to the intersecting side is calculated, and in the total parking area, an area from a straight line that is parallel to the intersecting side and where the interior corner with the greatest distance is located to the intersecting side is determined as the unavailable parking area.

h. In a case that the quantity of the intersecting sides equals to one and the quantity of the interior corners equals to three, a distance from each interior corner to the intersecting side is calculated, and in the total parking area, an area from a straight line that is parallel to the intersecting side and where the interior corner with the greatest distance is located to the intersecting side is determined as the unavailable parking area.

i. In a case that the quantity of the intersecting sides equals to two and the quantity of the interior corners equals to zero, an intersecting point between the detection box where the movable obstacle is located and sides of the quadrilateral are determined, and in the total parking area, an area from a straight line where the intersection point is located and that is parallel to the bottom side to the bottom side is determined as the unavailable parking area.

j. In a case that the quantity of the intersecting sides equals to two and the quantity of the interior corners equals to one, an intersecting point between the detection box where the movable obstacle is located and the sides of the quadrilateral is determined, a distance from each interior corner and each intersecting point to the bottom side is calculated, and in the total parking area, an area from a straight line that is parallel to the bottom side and where one of the interior corners and the intersecting point with the greatest distance is located to the bottom side is determined as the unavailable parking area.

k. In a case that the quantity of the intersecting sides equals to two and the quantity of the interior corners equals to two, an intersecting point between the detection box where the movable obstacle is located and the sides of the quadrilateral is determined, a distance from each interior corner and each intersecting point to the bottom side is calculated, and in the total parking area, an area from a straight line that is parallel to the bottom side and where one of the interior corners and the intersecting point with the greatest distance is located to the bottom side is determined as the unavailable parking area.

Further, in an embodiment, after the available parking area of the verified parking space is obtained in step S254*d*, step S250 may further include step S254*e*: in a case that the available parking area of the verified parking space is greater than or equal to an available parking area threshold, outputting the available parking area of the verified parking space;

and in a case that the available parking area of the verified parking space is smaller than the available parking area threshold, determining that that the verified parking space is unavailable, and outputting prompt information that the verified parking space is unavailable.

In the above parking space detection method, the parking space corners of each recognized parking space is recognized, the parking space verification is performed to screen out the verified parking space, such that the parking space that do not meet the requirements can be deleted in advance; the verified parking space is recorded and tracked by using the parking space tracking list, where the verified parking space of which the quantity of consecutive missing frames reaches the first frame quantity threshold is deleted from the parking space tracking list, and the parking space semantic information is outputted for each verified parking space of which the quantity of consecutive visible frames reaches the second frame quantity threshold, so that the verified parking space can be efficiently tracked and the parking space semantic information can be effectively outputted for the verified parking space in required detection image frames, without outputting the parking space semantic information of the verified parking spaces of which the quantity of consecutive missing frames reaches the first frame quantity threshold, thereby saving computation resources and improving computing efficiency; since the parking space semantic information and parking space verification are based on parking space corners that are finer, rather than rough parking space areas, the parking space verification and analysis of the parking space semantic information are more accurate and meticulous.

FIG. 11(*a*) shows an example of a bird's-eye view of a detected parking space in the conventional technology. It can be seen that the detected parking space in the conventional technology is only a rough range and do not contain accurate parking space corner information. FIG. 11(*b*) shows an example of a bird's-eye view of a parking space detected using the parking space detection method of the present disclosure. Compared with the conventional technology, the method of the present disclosure can detect the position of the parking space more accurately, and the displayed corners of each parking space border accurately correspond to the actual parking space corners.

It should be understood that although the various steps in the flow chart of FIG. 2 are displayed sequentially according to the arrows, these steps are not necessarily executed sequentially in the order indicated by the arrows. Unless otherwise specified herein, there is no strict order restriction on the execution of these steps, and these steps can be executed in other orders. Moreover, at least some of the steps in FIG. 2 may include multiple sub-steps or multiple stages. These sub-steps or stages are not necessarily executed at the same time, but may be executed at different times. These sub-steps or stages is not necessarily performed sequentially, but may be performed alternately or alternately with at least a part of other steps or sub-steps or stages of other steps.

In an embodiment, as shown in FIG. 12, a parking space detection apparatus 1200 is provided, including: a detection image obtaining module 1210, a parking space recognition module 1220, a parking space verification module 1230, a parking space tracking module 1240 and a parking space semantic output module 1250.

The detection image obtaining module 1210 is configured to obtain multiple consecutive detection image frames of a region in which a current vehicle is located.

The parking space recognition module 1220 is configured to, for each of the multiple consecutive detection image frames, recognize one or more recognized parking spaces and parking space corners of the recognized parking space.

The parking space verification module 1230 is configured to perform, based on the parking space corners, parking space verification to determine a verified parking space from the one or more recognized parking spaces.

The parking space tracking module 1240 is configured to track, by using a parking space tracking list, the verified parking space in the multiple consecutive detection image frames, to record, in the parking space tracking list, a quantity of consecutive visible frames among the plurality of consecutive detection image frames in which the verified parking space is recognized, and a quantity of consecutive missing frames among the plurality of consecutive detection image frames in which the verified parking space is not recognized, and delete the verified parking space from the parking space tracking list in a case that the quantity of the consecutive missing frames of the verified parking space reaches a first frame quantity threshold.

The parking space semantic output module 1250 is configured to determine and output, based on the parking space corners of the verified parking space, parking space semantic information of the verified parking space if the quantity of consecutive visible frames of the verified parking space in the parking space tracking list reaches a second frame quantity threshold.

For the limitations of the parking space detection apparatus 1200, reference may be made to the above-mentioned limitations of the parking space detection method, which will not be repeated here. Each module in the above-mentioned parking space detection apparatus 1200 may be implemented in whole or in part by software, hardware or a combination thereof. The above-mentioned modules may be embedded in or independent of a processor in the parking space detection apparatus in the form of hardware, and may also be stored in the memory of the parking space detection apparatus in the form of software, to be invoked by the processor to execute the corresponding operations of the above-mentioned modules.

Figure 13:
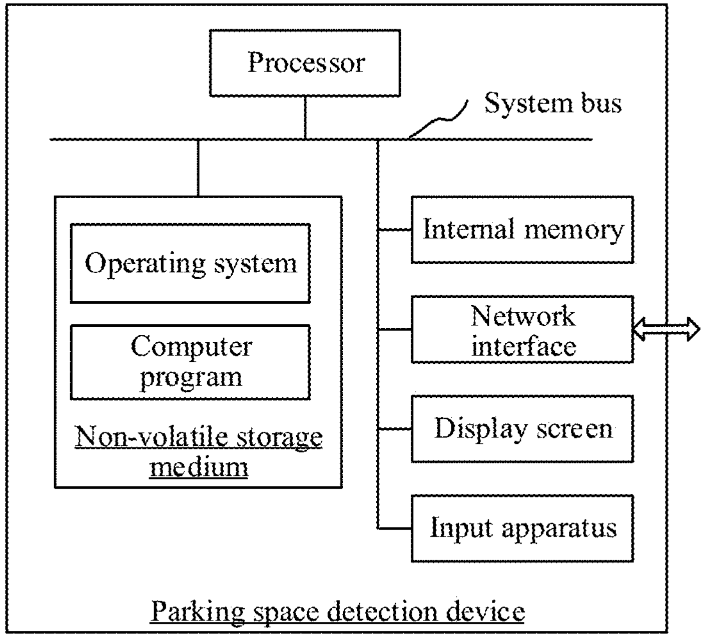
FIG. 13 is a schematic diagram showing an internal structure of a parking space detection device according to an embodiment.

In one embodiment, a parking space detection device is provided, the internal structure of which may be as shown in FIG. 13. The parking space detecting device includes a processor, a memory, a network interface, a display screen and an input device connected through a system bus. The processor of the parking space detection device is configured to provide calculation and control capabilities. The memory of the parking space detecting device includes a non-volatile storage medium and an internal memory. The non-volatile storage medium stores an operating system and computer programs. The internal memory provides an environment for the operation of the operating system and computer programs in the non-volatile storage medium. The network interface of the parking space detection device is configured to communicate with an external terminal through a network connection. When the computer program is executed by the processor, a parking space detection method is realized. The display screen of the parking space detection device may be a liquid crystal display or an electronic ink display, and the input device of the parking space detection device may be a touch layer covered on the display screen, or a button, a trackball or a touch pad arranged on a housing of the parking space detection device, or may be an external keyboard, touch pad or mouse.

Those skilled in the art can understand that the structure shown in FIG. 13 is only a block diagram of a part of the structure related to the solution of the present disclosure, and does not constitute a limitation to the parking space detection device to which the solution of the disclosure is applied. An application of the parking space detection devices may include more or fewer components than shown in the figures, or combine certain components, or have a different arrangement of components.

In one embodiment, a parking space detection device is provided. The parking space detection device is installed in a vehicle and communicated with an environment sensor installed on the vehicle. The parking space detection device includes a memory and a processor, and a computer program is stored in the memory. The processor implements the following steps when executing the computer program:

obtaining multiple consecutive detection image frames of a region in which a current vehicle is located;

for each of the multiple consecutive detection image frames, recognizing one or more recognized parking spaces and parking space corners of the recognized parking space;

performing, based on the parking space corners, parking space verification to determine a verified parking space from the one or more recognized parking spaces;

tracking, by using a parking space tracking list, the verified parking space in the multiple consecutive detection image frames, to record, in the parking space tracking list, a quantity of consecutive visible frames among the multiple consecutive detection image frames in which the verified parking space is recognized, and a quantity of consecutive missing frames among the multiple consecutive detection image frames in which the verified parking space is not recognized, and delete the verified parking space from the parking space tracking list in a case that the quantity of the consecutive missing frames of the verified parking space reaches a first frame quantity threshold; and determining and outputting, based on the parking space corners of the verified parking space, parking space semantic information of the verified parking space if the quantity of consecutive visible frames of the verified parking space in the parking space tracking list reaches a second frame quantity threshold.

In other embodiments, when executing the computer program, the processor also implements the steps of the vehicle detection method in any of the above embodiments.

In an embodiment, a computer-readable storage medium on which a computer program is stored is provided, and when the computer program is executed by a processor, the following steps are implemented:

obtaining multiple consecutive detection image frames of a region in which a current vehicle is located;

for each of the multiple consecutive detection image frames, recognizing one or more recognized parking spaces and parking space corners of the recognized parking space;

performing, based on the parking space corners, parking space verification to determine a verified parking space from the one or more recognized parking spaces;

tracking, by using a parking space tracking list, the verified parking space in the multiple consecutive detection image frames, to record, in the parking space tracking list, a quantity of consecutive visible frames among the multiple consecutive detection image frames in which the verified parking space is recognized, and a quantity of consecutive missing frames among the multiple consecutive detection image frames in which the verified parking space is not recognized, and delete the verified parking space from the parking space tracking list in a case that the quantity of the consecutive missing frames of the verified parking space reaches a first frame quantity threshold; and determining and outputting, based on the parking space corners of the verified parking space, parking space semantic information of the verified parking space if the quantity of consecutive visible frames of the verified parking space in the parking space tracking list reaches a second frame quantity threshold.

In other embodiments, when the computer program is executed by the processor, the steps of the vehicle detection method in any of the above embodiments are also implemented.

Those skilled in the art may understand that all or some of procedures of the method in the foregoing embodiments may be implemented by a computer program instructing relevant hardware. The computer program may be stored in a non-volatile computer-readable storage medium. The procedures of the foregoing method embodiments may be implemented when the computer program is executed. Any reference to a memory, a storage, a database, or another medium used in the embodiments provided in the present disclosure may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external high-speed cache. As an illustration instead of a limitation, the RAM is available in multiple forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a Rambus direct RAM (RDRAM), a direct Rambus dynamic RAM (DRDRAM), and a Rambus dynamic RAM (RDRAM).

Technical features of the foregoing embodiments may be arbitrarily combined. In order to make description concise, not all possible combinations of the technical features in the foregoing embodiments are described. The combinations of these technical features shall be considered as falling within the scope covered by this specification as long as there is no conflict.

The foregoing embodiments only show some implementations of the present disclosure, and are described in detail. These embodiments should not be construed as a limitation on the scope of the present disclosure. Several transformations and improvements can be made by those skilled in the art without departing from the concept of the present disclosure, and belong to the protection scope of the present disclosure. Therefore, the protection scope of the present disclosure shall be subject to the appended claims.

What is claimed is:

1. A parking space detection method, comprising:

obtaining a plurality of consecutive detection image frames of a region in which a current vehicle is located;

for each of the plurality of consecutive detection image frames, recognizing one or more recognized parking spaces and parking space corners of the recognized parking space;

performing, based on the parking space corners, parking space verification to determine a verified parking space from the one or more recognized parking spaces;

tracking, by using a parking space tracking list, the verified parking space in the plurality of consecutive detection image frames, to record, in the parking space tracking list, a quantity of consecutive visible frames among the plurality of consecutive detection image frames in which the verified parking space is recognized, and a quantity of consecutive missing frames among the plurality of consecutive detection image frames in which the verified parking space is not recognized, and delete the verified parking space from the parking space tracking list in a case that the quantity of the consecutive missing frames of the verified parking space reaches a first frame quantity threshold; and determining and outputting, based on the parking space corners of the verified parking space, parking space semantic information of the verified parking space if the quantity of consecutive visible frames of the verified parking space in the parking space tracking list reaches a second frame quantity threshold.

2. The parking space detection method according to claim 1, wherein the performing, based on the parking space corners, parking space verification to determine a verified parking space from the one or more recognized parking spaces comprises:

for each of the one or more recognized parking spaces, determining whether the parking space corners of the recognized parking space satisfy a parking space self-verification condition, and determining that the recognized parking space is a verification failed parking space if the parking space corners of the recognized parking space do not satisfy the parking space self-verification condition;

for a plurality of recognized parking spaces in a same detection image frame, determining, according to a mutual relationship between the plurality of recognized parking spaces, whether each of the plurality of recognized parking spaces satisfies a parking space mutual verification condition, and determining recognized parking spaces that do not meet the parking space mutual verification condition as verification failed parking spaces;

for recognized parking spaces in two different detection image frames, determining whether the recognized parking spaces in the two different detection image frames meet an inter-frame verification condition, and determining that the recognized parking spaces are verification failed parking spaces in a case that the recognized parking spaces do not meet the inter-frame verification condition; and determining a recognized parking space that meets the parking space self-verification condition, the parking space mutual verification condition and the inter-frame verification condition as the verified parking space.

3. The parking space detection method according to claim 2, wherein the parking space self-verification condition comprises one or a combination of a plurality of the following:

the quantity of the parking space corners of the recognized parking space conforms to a predetermined parking space corner quantity;

the parking space corners of the recognized parking space are all within a predetermined region of interest;

a quadrilateral formed by the parking space corners of the recognized parking space is a convex quadrilateral; and a geographic area of a quadrilateral formed by the parking space corners of the recognized parking space in a current detection image frame to which the recognized parking space belongs falls within a predetermined geographic area range.

4. The parking space detection method according to claim 2, wherein the parking space mutual verification condition comprises one or a combination of a plurality of the following:

a parking space ID of the recognized parking space is not the same as parking space IDs of other recognized parking spaces in a same detection image frame; and a difference between a geographic area of a quadrilateral formed by the parking space corners of the recognized parking space in the detection image frame and an average value of geographical areas of quadrilaterals formed by the parking space corners of other recognized parking spaces in the same detection image frame is within a predetermined difference threshold.

5. The parking space detection method according to claim 2, wherein the inter-frame verification condition comprises one or a combination of a plurality of the following:

a time stamp of a current detection image frame to which the recognized parking space belongs is not the same as a time stamp of any historical detection image frame previous to the current detection image frame; and the parking space semantic information of the recognized parking space in the current detection image frame to which the recognized parking space belongs is consistent with the parking space semantic information of the same recognized parking space in a historical detection image frame previous to the current detection image frame.

6. The parking space detection method according to claim 1, wherein the tracking, by using a parking space tracking list, the verified parking space in the plurality of consecutive detection image frames comprises:

recording a parking space state of each of the verified parking space in the parking space tracking list, the parking space state comprising a new state, a predicted state, an updated state and an invalid state, comprising: for each of the verified parking space determined from the plurality of consecutive detection image frames, in a case that the verified parking space is recognized for the first time in a detection image frame among the plurality of consecutive detection image frames, recording the verified parking space in the parking space tracking list and marking the parking space state of the verified parking space as the new state;

in a case that the verified parking space is recognized again in any detection image frame subsequent to the detection image frame, marking the parking space state of the verified parking space as the updated state;

in a case that the verified parking space is not recognized in any detection image frame subsequent to the detection image frame, marking the parking space state of the verified parking space as the predict state; and in a case that a quantity of consecutive missing frames subsequent to the detection image frame in which the verified parking space in the predict state or the updated state is not recognized reaches the first frame quantity threshold, marking the parking space state of the verified parking space as the invalid state.

7. The parking space detection method according to claim 1, wherein the tracking, by using a parking space tracking list, the verified parking space in the plurality of consecutive detection image frames comprises: determining, by using an intersection over union between verified parking spaces in two detection image frames, whether the verified parking spaces in the two detection image frames are a same parking space.

8. The parking space detection method according to claim 7, wherein the determining, by using an intersection over union between verified parking spaces in two detection image frames, whether the verified parking spaces in the two detection image frames are a same parking space comprises:

calculating the intersection over union between each of the verified parking spaces in a former detection frame among the two detection frames and each of the verified parking spaces in a latter detection frame among the two detection frames;

determining a verified parking space among the verified parking spaces in the latter detection image frame and a verified parking space among the verified parking spaces in the former detection image frame between which the intersection over union is greater than or equal to a predetermined intersection over union threshold as a same detection image frame; and determining a verified parking space among the verified parking spaces in the latter detection image frame and a verified parking space among the verified parking spaces in the former detection image frame between which the intersection over union is less than the predetermined intersection over union threshold as different detection image frames.

9. The parking space detection method according to claim 8, wherein the calculating the intersection over union between each of the verified parking spaces in a previous detection image frame among the two detection image frames and each of the verified parking spaces in a subsequent detection image frame among the two detection image frames comprises:

superimposing the two detection image frames to obtain a superimposed detection map;

for a first verified parking space among the verified parking spaces in the former frame among the two detection image frames and a second verified parking space among the verified parking spaces in the latter detection image frame among the two detection image frames:

using a maximum value and a minimum value of the parking space corners of the first verified parking space and the parking space corners of the second verified parking space in a vertical direction in the superimposed detection map as an upper boundary and a lower boundary of a bounding rectangle respectively, and using a maximum value and a minimum value of the parking space corners of the first verified parking space and the parking space corners of the second verified parking space in a horizontal direction in the superimposed detection map as a left boundary and a right boundary of the bounding rectangle respectively, to determine the bounding rectangle of the parking space corners of the first verified parking space and the parking space corners of the second verified parking space in the superimposed detection map;

determining the intersection over union between the first verified parking space and the second verified parking space to be zero in a case that a length of at least one side of the bounding rectangle is greater than a predetermined side length threshold;

generating a grid map by using the bounding rectangle as a boundary, and determining a quantity of grids occupied by the first verified parking space in the grid map and a quantity of grids occupied by the second verified parking space in the grid map, in a case that the length of each side of the bounding rectangle is less than or equal to the predetermined side length threshold; and calculating the intersection over union between the first verified parking space and the second verified parking space based on the quantity of grids occupied by the first verified parking space in the grid map and the quantity of grids occupied by the second verified parking space in the grid map.

10. The parking space detection method according to claim 1, wherein the parking space semantic information comprises one or more of a parking space corner position, a parking space corner order, a main road direction, a parking space entrance side, a parking space depth, a parking space width, a parking space orientation, a parking space direction type, and a parking space available parking area.

11. The parking space detection method according to claim 10, wherein in a case that the parking space semantic information comprises the parking space corner position, the method further comprises:

performing smoothing processing on the parking space corner position of the verified parking space in a current detection image frame based on the parking space corner position of the verified parking space in a previous detection image frame by using a Kalman filter, to determine and output a smoothed parking space corner position as the parking space corner position of the verified parking space in the current detection image frame.

12. The parking space detection method according to claim 10, wherein in a case that the parking space semantic information comprises the parking space corner order, the method further comprises:

matching the parking space corner order of the verified parking space in a current detection image frame with the parking space corner order of the verified parking space in a previous detection image frame, to cause the parking space corner order in the current detection image frame to be consistent with the parking space corner order in the previous detection image frame.

13. The parking space detection method according to claim 10, wherein in a case that the parking space semantic information comprises the main road direction, the determining, based on the parking space corners of the verified parking space, parking space semantic information of the verified parking space comprises: for any current detection image frame, recognizing one or more pairs of adjacent parking spaces in the current detection image frame;

for each of the one or more pairs of adjacent parking spaces, determining a centroid direction vector from a centroid of a first parking space of the pair of adjacent parking spaces to a centroid of a second parking space of the pair of adjacent parking spaces, to obtain one or more centroid direction vectors;

classifying the one or more centroid direction vectors to determine one or more centroid direction classes; and determining the main road direction based on one of the centroid direction vectors corresponding to one of the centroid direction classes having the greatest total quantity of centroid direction vectors.

14. The parking space detection method according to claim 10, wherein in a case that the parking space semantic information comprises the parking space available parking area, the determining, based on the parking space corners of the verified parking space, semantic parking space information of the verified parking space comprises:

determining a total parking area of the verified parking space based on the parking space corners of the verified parking space;

detecting whether there is an obstacle in the verified parking space;

subtracting, in a case that there is an obstacle in the verified parking space, an unavailable parking area occupied by the obstacle from the total parking area, to obtain the available parking area of the verified parking space; and determining the total parking area as the available parking area of the verified parking space in a case that there is no obstacle in the verified parking space.

15. The parking space detection method according to claim 14, wherein the obstacle comprises a fixed obstacle and/or a movable obstacle;

in a case of determining that there is a fixed obstacle in the verified parking space, calculating the unavailable parking area of the fixed obstacle according to a predetermined calculation rule corresponding to the fixed obstacle; and in a case of determining that there is a movable obstacle in the verified parking space, determining an intersecting side that is among sides of a polygon defined by the parking space corners of the verified parking space and that intersects with the movable obstacle and an interior corner which is a corner of the movable obstacle that is located within the polygon defined by the parking space corners of the verified parking space, searching an unavailable parking area calculation table by using the intersection and the interior corner for a target calculation rule corresponding to the intersection and the interior corner, and calculating the unavailable parking area of the movable obstacle by using the target calculation rule.

16. A parking space detection apparatus, comprising:

a detection image obtaining module, configured to obtain a plurality of consecutive detection image frames of a region in which a current vehicle is located;

a parking space recognition module, configured to, for each of the plurality of consecutive detection image frames, recognize one or more recognized parking spaces and parking space corners of the recognized parking space;

a parking space verification module configured to perform, based on the parking space corners, parking space verification to determine a verified parking space from the one or more recognized parking spaces;

a parking space tracking module configured to track, by using a parking space tracking list, the verified parking space in the plurality of consecutive detection image frames, to record, in the parking space tracking list, a quantity of consecutive visible frames among the plurality of consecutive detection image frames in which the verified parking space is recognized, and a quantity of consecutive missing frames among the plurality of consecutive detection image frames in which the verified parking space is not recognized, and delete the verified parking space from the parking space tracking list in a case that the quantity of the consecutive missing frames of the verified parking space reaches a first frame quantity threshold; and a parking space semantic output module, configured to determine and output, based on the parking space corners of the verified parking space, parking space semantic information of the verified parking space if the quantity of consecutive visible frames of the verified parking space in the parking space tracking list reaches a second frame quantity threshold.

17. The parking space detection apparatus according to claim 16, wherein the parking space detection apparatus is configured to be mounted on a vehicle, and comprises a memory and a processor.

18. A non-transitory computer-readable storage medium storing a computer program, wherein the computer program, when executed by a processor, causes the processor to perform operations, the operations comprising:

obtaining a plurality of consecutive detection image frames of a region in which a current vehicle is located;

for each of the plurality of consecutive detection image frames, recognizing one or more recognized parking spaces and parking space corners of the recognized parking space;

performing, based on the parking space corners, parking space verification to determine a verified parking space from the one or more recognized parking spaces;

tracking, by using a parking space tracking list, the verified parking space in the plurality of consecutive detection image frames, to record, in the parking space tracking list, a quantity of consecutive visible frames among the plurality of consecutive detection image frames in which the verified parking space is recognized, and a quantity of consecutive missing frames among the plurality of consecutive detection image frames in which the verified parking space is not recognized, and delete the verified parking space from the parking space tracking list in a case that the quantity of the consecutive missing frames of the verified parking space reaches a first frame quantity threshold; and determining and outputting, based on the parking space corners of the verified parking space, parking space semantic information of the verified parking space if the quantity of consecutive visible frames of the verified parking space in the parking space tracking list reaches a second frame quantity threshold.

19. The non-transitory computer-readable storage medium according to claim 18, wherein the performing, based on the parking space corners, parking space verification to determine a verified parking space from the one or more recognized parking spaces comprises:

for each of the one or more recognized parking spaces, determining whether the parking space corners of the recognized parking space satisfy a parking space self-verification condition, and determining that the recognized parking space is a verification failed parking space if the parking space corners of the recognized parking space do not satisfy the parking space self-verification condition;

for a plurality of recognized parking spaces in a same detection image frame, determining, according to a mutual relationship between the plurality of recognized parking spaces, whether each of the plurality of recognized parking spaces satisfies a parking space mutual verification condition, and determining recognized parking spaces that do not meet the parking space mutual verification condition as verification failed parking spaces;

for recognized parking spaces in two different detection image frames, determining whether the recognized parking spaces in the two different detection image frames meet an inter-frame verification condition, and determining that the recognized parking spaces are verification failed parking spaces in a case that the recognized parking spaces do not meet the inter-frame verification condition; and determining a recognized parking space that meets the parking space self-verification condition, the parking space mutual verification condition and the inter-frame verification condition as the verified parking space.

20. The non-transitory computer-readable storage medium according to claim 19, wherein the parking space self-verification condition comprises one or a combination of a plurality of the following:

the quantity of the parking space corners of the recognized parking space conforms to a predetermined parking space corner quantity;

the parking space corners of the recognized parking space are all within a predetermined region of interest;

a quadrilateral formed by the parking space corners of the recognized parking space is a convex quadrilateral; and a geographic area of a quadrilateral formed by the parking space corners of the recognized parking space in a current detection image frame to which the recognized parking space belongs falls within a predetermined geographic area range.

* * * * *